United States Patent [19]

LeClaire

[11] 4,080,924

[45] Mar. 28, 1978

[54] WARNING SIGNAL DEVICE

[76] Inventor: William LeClaire, 10359 Carrolwood La., Tampa, Fla. 33618

[21] Appl. No.: 723,908

[22] Filed: Sep. 16, 1976

[51] Int. Cl.² .............................................. B60Q 1/52
[52] U.S. Cl. .................................. 116/28 R; 116/63 P
[58] Field of Search ................. 116/28 R, 63 R, 63 P, 116/114 R; 58/116 R

[56] References Cited

U.S. PATENT DOCUMENTS

| | | | |
|---|---|---|---|
| 1,903,482 | 4/1933 | Senseney | 116/63 P |
| 2,115,271 | 4/1938 | LaLonde | 116/63 P |
| 2,781,017 | 2/1957 | Fuller | 116/63 P |
| 3,817,027 | 6/1974 | Wittner | 58/116 R |

*Primary Examiner*—S. Clement Swisher
*Assistant Examiner*—Denis E. Corr
*Attorney, Agent, or Firm*—Larson, Taylor and Hinds

[57] ABSTRACT

A signal device is provided that includes a signal flag or reflector mounted at one end of an oscillating pole for providing visual identification of a hazard. The signal device is coated with light reflective material and is mountable to, for example, the roof of a disabled car. The device further includes a spring powered motor capable of oscillating the pole for an extended period.

9 Claims, 7 Drawing Figures

U.S. Patent    March 28, 1978    Sheet 1 of 2    4,080,924
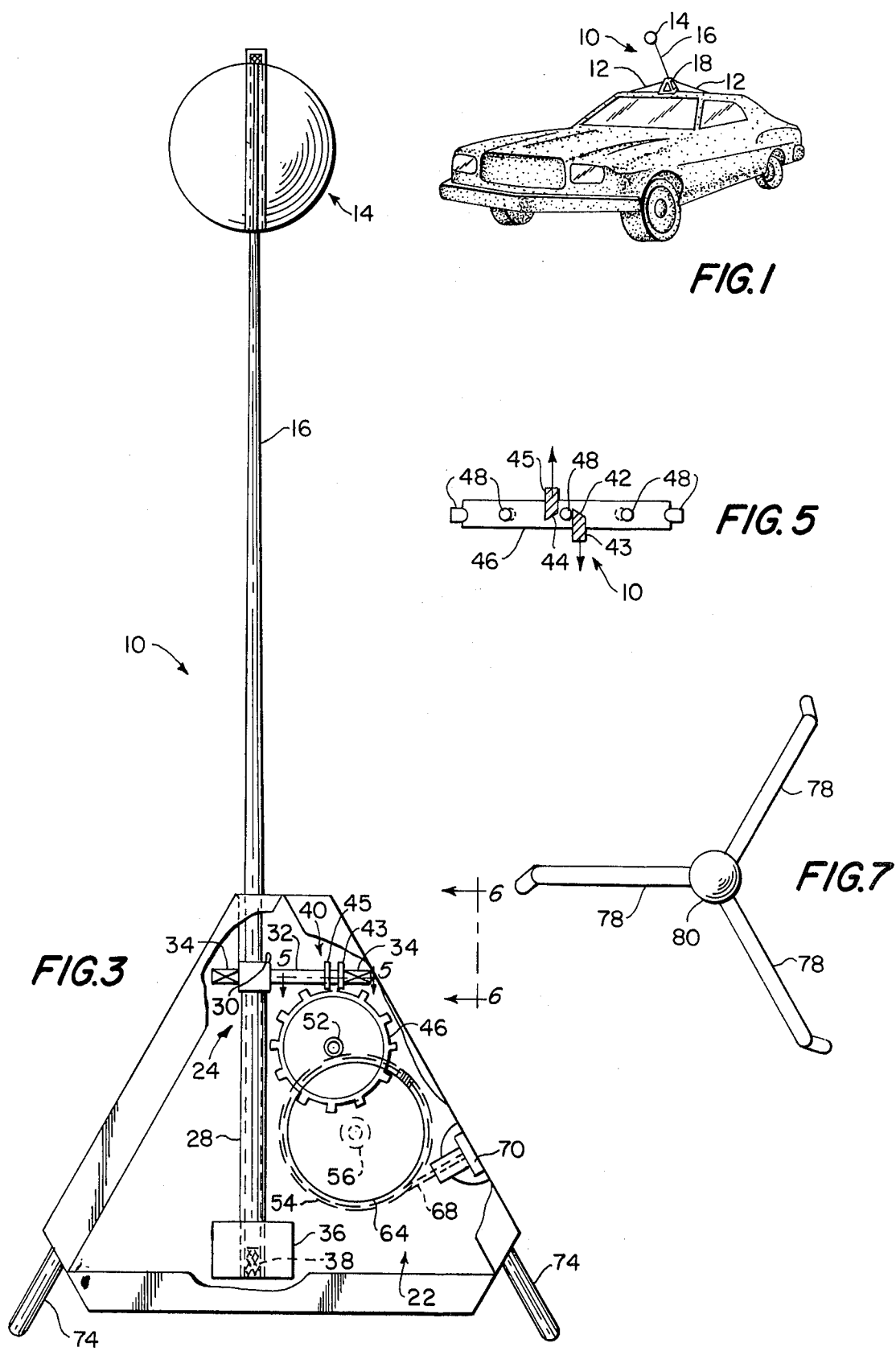

WARNING SIGNAL DEVICE

BACKGROUND OF THE INVENTION

1. Field of the Invention

This invention relates to signal devices and more particularly to devices having light reflective warning flags or reflectors secured to an oscillating pole for providing visual identification of a hazardous condition.

2. Description of the Prior Art

A variety of prior art devices are available for providing visual identification of an existing hazardous condition. Of these, a great many are stationary and include flashers, flags and barriers, some devices including light reflective material. However, under certain atmospheric conditions and particularly in the dark, many stationary devices are only seen for a relatively short distance, owing to the fact that the devices emit warning signals in a limited number of directions and that stationary signals are generally less noticeable than moving signals. In addition, flashers are usually powered by batteries, the ever diminishing current of which can render the flashers useless unless the batteries are recharged or other batteries are supplied.

Examples of prior art devices are disclosed in U.S. Pat. Nos. 3,762,360 to Hawes and 1,798,052 to Additon. These include rotatable flag-type warning devices that can, for example, be mounted to a disabled car.

SUMMARY OF THE INVENTION

In accordance with the invention, a warning signal device for providing visual identification of a hazardous condition is presented and comprises a base, an elongated pole, and means for pivotally mounting the pole at a pivot point to the base, a signal means, such as a flag or reflector, mounted at one end of the pole, a motor means for oscillating the pole and thus the signal means relative to the base by displacing said mounting means about said pivot from an equilibrium position, and a counterweight for returning the displaced mounting means to the equilibrium position. The base and flag or reflector preferably are covered with a light reflective material.

In a preferred embodiment the motor means is coupled to the axis of the means for pivotally mounting the pole at the pivotal axis thereof and displaces the mounting means from an equilibrium position. Advantageously, the mounting means includes an elongated sleeve pivotally secured to the base for telescopingly accepting one end of the pole. A counterweight is preferably secured to the sleeve at a point distal from the pivot point for returning the mounting means displaced by the motor means to the equilibrium position.

In an especially preferred embodiment of the invention, the mounting means includes a cam means comprised of a first cam with an inclined surface and a second cam with an oppositely inclined surface spaced from the first cam. The motor includes a rotating cog wheel, each of the cogs slidably engaging the first inclined surface thereby rotating the pivotal mounting means in a forward direction. After disengagement from the first cam, the cog moves into the space between the cams thereby permitting the counterweight to return the mounting means to an equilibrium position. Each cog then engages the second inclined surface thereby rotating the pivotal mounting means in a reverse direction.

Thus the present invention provides for a signal device having a flag or reflector mounted on an oscillating pole for maximizing the area of exposure and thus the visual effectiveness of the signal in identifying a hazardous condition, such as for example, a disabled vehicle. The device is compact, easily portable, and easily mountable on, for example, the roof of a vehicle. Further, since the warning signal device is capable of utilizing a motor means having a operating period of up to or exceeding twenty-four hours, the device can be easily re-energized on a convenient time schedule without, for example, the need to re-energize or change an electrical power source.

Additional features and advantages of the invention will be set forth in, or apparent from, the detailed description of the preferred embodiment of the invention found hereinbelow.

BRIEF DESCRIPTION OF THE DRAWINGS

FIG. 1 is a perspective view of the warning signal device mounted on the roof of a car;

FIG. 3 is a side elevation view of the device of FIG. 1 with a central portion of the triangular side removed to reveal the motor;

FIG. 5 is a cross section taken along line 5—5 of FIG. 3 depicting the cog wheel engaging the cam;

FIG. 7 is a cross sectional view taken along line 7—7 of FIG. 2.

DETAILED DESCRIPTION OF THE PREFERRED EMBODIMENT

Figure 4:
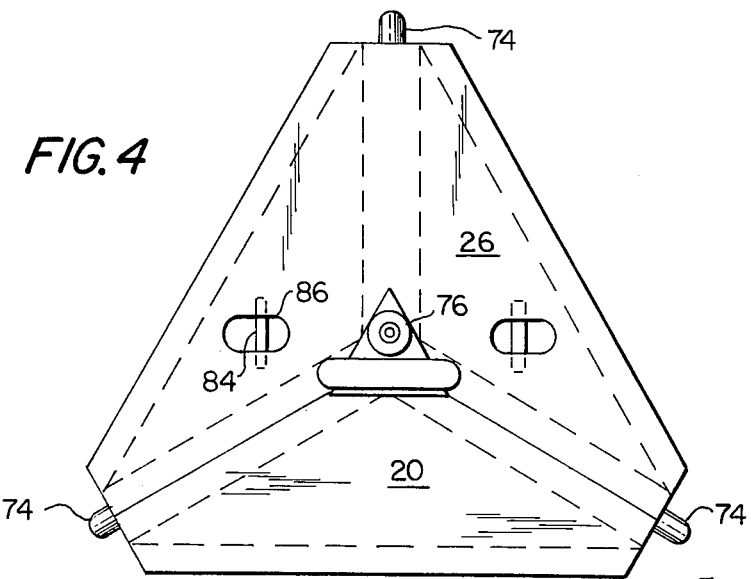
FIG. 4 is a top view of the warning signal device of FIG. 1 with the oscillating pole removed.

With reference to the Figures, and, in particular, to FIG. 1, there is depicted the preferred embodiment of warning signal device 10 secured to the roof of an automobile by tension cords 12 that extend from device 10 to the roof gutters. Device 10 includes a signal flag or reflector 14 removably secured to an elongate pole 16 pivotally mounted to a pyramidal shaped base 18 so that flag or reflector 14 and pole 16 can oscillate with respect to base 18.

Figure 2:
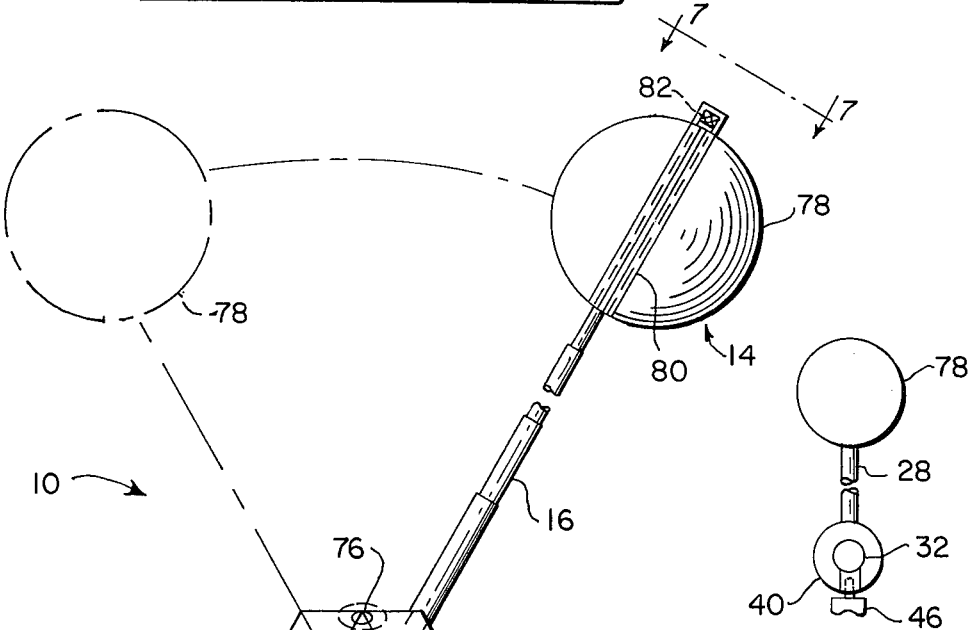
FIG. 2 is a front elevation view of the device of FIG. 1 with a central portion of the triangular side removed to reveal the motor.

With reference to FIGS. 2 and 3, the front and side elevational views of signal device 10 are depicted. In FIG. 2 a triangular central portion of front triangular plate 20 of base 18 is removed to reveal motor mechanism 22 and pivotal pole mounting mechanism 24. In FIG. 3 a generally triangular central portion of the side triangular plate 26 of base 18 is removed to reveal mechanism 22 and 24.

Pivotal mounting mechanism 24 includes an elongated sleeve 28 with an aperture at upper end 30 for receiving an end portion of pole 16. Rigidly mounted onto upper end 30 of sleeve 28 is a transversely extending shaft 32 that is rotatably mounted at the ends thereof in bearings 34 in base 18. Elongated sleeve 28 is thus pivotable about the longitudinal axis of shaft 32 and in a plane perpendicular thereto.

At the lower end of sleeve 28 is a counterweight or weight 36. Weight 36 has a sufficient mass and is located a sufficient distance from the pivot point of sleeve 38 to cause sleeve 38 with pole 16 mounted therein to pivot about the axis of shaft 32 to a vertical equilibrium position when pole 16 and sleeve 28 are displaced from the vertical equilibrium position. Further, at the lower end of sleeve 28 is a magnet 38 that magnetically secures pole 16 in sleeve 28.

Figure 6:
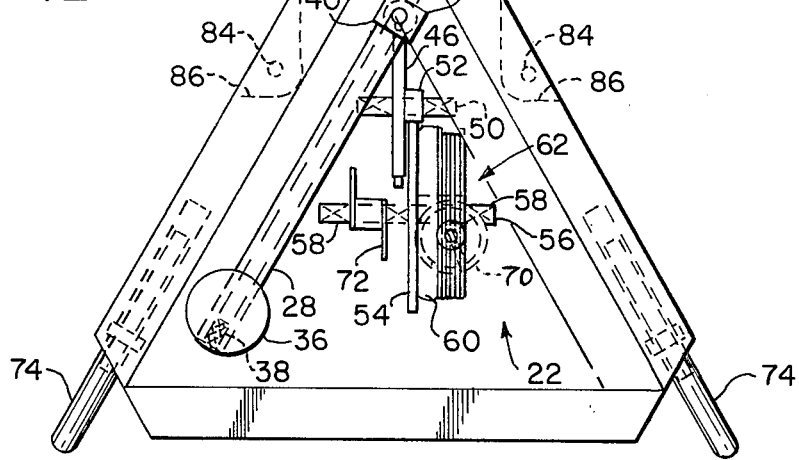
FIG. 6 is a cross sectional view taken along line 6—6 of FIG. 3.

A two-lobe intermittent cylindrical cam means 40 (also see FIGS. 5 and 6) is coaxially mounted to shaft 32. Cam means 40 includes a first inclined surface 42 (FIG. 5) on a first cam or lobe 43 and a second inclined surface 44 on a second cam or lobe 45. Lobes 43 and 45 are spaced apart a predetermined distance that is slightly larger than the diameter of cogs 48 on a cog wheel 46, described hereinbelow. The plane of surfaces 42 and 44 are oblique to the axis of shaft 32, surface 42 being generally forwardly inclined and surface 44 being generally backwardly inclined.

Engaging cam means 40 is a cog wheel or pawl wheel 46 with a plurality of cylindrical cogs or pawls 48, each of which has a longitudinal axis coincidental with a radius of cog wheel 46. When cog wheel 46 rotates, each cog 48 in turn contacts and slides across first inclined surface 42, urging first lobe 43 and thus shaft 32 and sleeve 28 to rotate in a forward direction. As cog wheel 46 rotates a further amount, cog 48 disengages from surface 40 and enters the space between first and second lobes 43 and 45 and contacts the side of lobe 45. Further rotation of cog wheel is temporarily prevented until weight 36 returns sleeve 28 to the vertical equilibrium position. Cog 48 then can slidably engage second inclined surface 44, urging second lobe 45 and thus shaft 32 and sleeve 28 to rotate in a backwardly direction. Finally, after further rotation of cog wheel 46, cog 48 becomes disengaged from second lobe 45 and weight 36 can again return sleeve 28 to the vertical equilibrium position preparatory for the next cog 48 to begin the cycle again.

Cog wheel is rotatably mounted on a shaft journalled in bearings 50 at each end thereof (FIG. 2). Mounted coaxially with cog wheel 46 on the same shaft is a pinion gear 52 driven by a drive gear 54 of motor mechanism 22. Gear 54 and motor mechanism 22 are coaxially mounted on a shaft 56, shaft 56 being in turn rotatably mounted to base 18 in bearings 58 (FIG. 2).

Motor means 22 includes an energy storage spiral spring contained in housing 60 and a spring winding mechanism 62. Winding mechanism 62 includes a spool 64 (FIG. 3) on which a cable 68 is wound. The free end of the cable is secured to a pull knob 70. A pull on knob 70 unwinds cable 68 from spool 64, thereby winding the spring and storing energy in the spring. Cable 68 is automatically rewound on spool 64. Further, motor mechanism 22 includes a back stop, single direction spring 72 (FIG. 2) coaxially mounted on shaft 56 so as to allow the transmittal of energy from the unwinding spring in housing 60 to drive gear 54.

A plurality of adjustable feet 74, are adjustably mounted by screw means into base 18. Further as seen in FIG. 4, a leveling device 76, such as for example a mercury ball level, is affixed to the uppermost part of base 18. Thus feet 74 can be adjusted until the signal device 10 is approximately leveled.

Flag or reflector 14 of warning signal device 10 as depicted in FIGS. 1 and 7 can include a plurality of vanes 78 extending radially from a central sleeve 80. Sleeve 80 is rotatably mounted over the end of elongate pole 16. Wind urges vanes 78 and sleeve 80 to rotate on pole 16. Further a magnet 82 (FIG. 2) located inside sleeve 80 magnetically attracts pole 16 so as to removably secure flag or reflector 14 to pole 16.

As stated above, tension straps 12 can be used to secure signal device 10 to, for example, the roof of a car. One end of the straps engage pins 84 (see FIGS. 2 and 4) mounted in wells 86 of base 18.

In a preferred embodiment, base 18 can be comprised of an injection molded plastic. Further the three triangular sides that form pyramidal base 18 are coated with the internationally recognized hazard symbol, a reflective orange triangle boarded by a red band. Also, flag or reflector 14 can be coated with a reflective material. Further pole 16 can be telescopic, and pole 16, the tension straps, and flag 14 can be stored in base 18, designed so as to accommodate the aforementioned.

The operation of warning signal device 10 is as follows. The device is first mounted and approximately leveled, for example, on the roof of a disabled car. Then pole 16 is inserted into and removably secured to pivotally mounted sleeve 28 by magnet 38. Flag or reflector 14 is then slid over the other end of pole 16 and removably secured thereto by magnet 82.

Knob 70 is pulled from base 18 so as to wind up and energize the spring in housing 60. The energized spring effects the retraction of cable 68 and causes drive gear 54 and thus driven pinion gear 52 and cog wheel 46 to rotate. A cog 48 of cog wheel 46 engages first inclined cam surface 42 urging lobe 43, pivotal pole mounting mechanism 24, pole 16, and flag or reflector 14 to rotate in a forward direction. Following the disengagement of cog 48 from cam surface 42, weight 38, mounted at the lower end of mounting mechanism 24, urges mechanism 24 and thus pole 16 and flag or reflector 14 to a vertical equilibrium position. Then cog 48 engages second inclined cam surface 44 urging lobe 45, pole mounting mechanism, pole 16, and flag or reflector 14 to rotate in a backward direction. Again following the disengagement of cog 48 from cam surface 44, weight 38 urges pole 16 and flag or reflector 14 to a vertical equilibrium position preparatory for the next cog 48 to engage lobe 43. The full swing arc of pole 16 is depicted in FIG. 2. Thus a highly visible oscillating hazard signal is effected.

It should be understood that in an alternate embodiment the flag or reflector 14 can be replaced by, for example, a battery powered, flashing light. Further the spring and motor means can be designed to operate for periods of twenty-four hours or more. Also, whenever continuous, attention-free, operation is necessary, the spring motor can be rewound by an intermittently operated electric motor thus providing for long battery life.

The pole can be constructed of fiberglass with metal tipped ends. Also sand can be included in a space added to the base to provide for dead weight.

It should also be understood that the device can be built into, for example, the various surfaces of a vehicle.

The signal device can have additional uses, such as, for example, bringing attention to advertisements placed adjacent thereto. Further a tripping mechanism may be incorporated into the base, the tripping mechanism being remotely controllable. The tripping mechanism can then on remote command, initiate warning signal operation so as to act on, for example, a silent alarm.

Although the present invention has been described relative to an exemplary embodiment thereof, it will be understood by those skilled in the art that variations and modifications can be effected in these embodiments without departing from the scope and spirit of the invention.

I claim:

1. A signal device comprising:
   a base;
   a removable elongated pole;
   mounting means in said base for pivotally mounting said pole at a pivot point to said base said mounting means comprising an elongated sleeve member for telescopically mounting said pole therein and a mounting shaft positioned substantially perpendicularly with respect to said pole and pivotally mounted in said base, said sleeve member being mounted to and pivotable about the longitudinal axis of said mounting shaft;
   a signal means mounted at one end of said pole;
   motor means in said base for displacing said mounting means about said pivot point from an equilibrium position;
   a counterweight secured to said elongate sleeve member distally from said pivot point for returning the displaced mounting means to the equilibrium position; and
   means for removably securing said pole in said sleeve member.

2. A signal device as claimed in claim 1 wherein said mounting shaft is fixed substantially perpendicularly with respect to said sleeve member and about which said pole is oscillated, and said motor means oscillates said mounting shaft.

3. A signal device as claimed in claim 1 wherein said mounting means further includes a transversely extending shaft secured to said elongate sleeve member, said shaft being rotatably pivotally mounted to said base, said signal device further including a cam means rigidly secured to said shaft and engaged by said motor means for rotating said pivotal mounting means in a forward direction and then in a reverse direction, said counterweight returning said pivotal mounting means to an equilibrium position between the forward shaft rotation and the reverse shaft rotation.

4. A signal device in accordance with claim 3 wherein said cam means includes spaced apart first and second cams having respective inclined surfaces, and wherein said motor means includes a cog wheel having a plurality of circumferentially spaced cogs, each said cog for firstly, slidably engaging said first inclined surface so as to displace said first cam and thereby rotate said mounting means in a forward direction, then for traversing the space between said cams thereby permitting said counterweight to return said mounting means to an equilibrium position and finally for engaging said second inclined surface so as to displace said second cam and thereby rotate said mounting means in a reverse direction.

5. A signal device in accordance with claim 4 wherein said motor means includes an energy storage spiral spring and a drive gear for rotating said cog wheel, said spring and gear rigidly mounted coaxially on a second shaft rotatably secured to said base, said motor means further including a take-up spool and a cable wound around said spool, said spool also mounted coaxially on said second shaft whereby said spring can be wound by rotating said spool by pulling the cable attached thereto thereby storing energy in said spring.

6. A signal device in accordance with claim 1 wherein said base includes three triangularly shaped sides joined so as to form a pyramid, said base including at the top portion thereof an elongated slot through which said pole can extend.

7. A signal device in accordance with claim 1 wherein said pole securing means includes a magnet positioned distally from said first end for telescopingly retaining said pole therein.

8. A signal device in accordance with claim 1 wherein said pole is comprised of a plurality of telescopic sections and said pole is removably secured to said mounting means thereby providing easy storage when said pole is removed from said mounting means.

9. A signal device in accordance with claim 1 wherein said base is light reflective and includes a level indicating means and a plurality of adjustable legs for leveling said base.

* * * * *